United States Patent
Vinayak et al.

(10) Patent No.: US 9,535,441 B2
(45) Date of Patent: Jan. 3, 2017

(54) TRANSIENT SUPPRESSION WITH LOSSLESS STEADY STATE OPERATION

(71) Applicant: QUANTANCE, INC., Woburn, MA (US)

(72) Inventors: Vikas Vinayak, Menlo Park, CA (US); Serge Francois Drogi, Flagstaff, AZ (US)

(73) Assignee: QUANTANCE, INC., Woburn, MA (US)

( * ) Notice: Subject to any disclaimer, the term of this patent is extended or adjusted under 35 U.S.C. 154(b) by 228 days.

(21) Appl. No.: 14/207,292

(22) Filed: Mar. 12, 2014

(65) Prior Publication Data

US 2014/0266128 A1    Sep. 18, 2014

Related U.S. Application Data

(60) Provisional application No. 61/780,192, filed on Mar. 13, 2013.

(51) Int. Cl.
*G05F 3/00* (2006.01)
*G05F 1/613* (2006.01)
*H02J 3/28* (2006.01)
*H02J 7/00* (2006.01)

(52) U.S. Cl.
CPC ............. *G05F 1/613* (2013.01); *H02J 3/28* (2013.01); *H02J 7/0068* (2013.01)

(58) Field of Classification Search
CPC ............. G05F 1/613; H02J 7/0068; H02J 3/28
USPC ............................................ 323/304; 361/111
See application file for complete search history.

(56) References Cited

U.S. PATENT DOCUMENTS

| | | | | |
|---|---|---|---|---|
| 5,166,630 A | * | 11/1992 | Lee | ................................. 327/554 |
| 5,822,166 A | * | 10/1998 | Massie | ................... H02H 3/243 307/87 |
| 5,963,439 A | * | 10/1999 | Wuidart et al. | ................... 363/46 |
| 6,522,111 B2 | | 2/2003 | Zadeh et al. | |
| 2005/0242786 A1 | * | 11/2005 | Sawyers et al. | ............... 323/211 |
| 2009/0212753 A1 | | 8/2009 | Lou | |
| 2009/0224737 A1 | * | 9/2009 | Lou | .......................... G05F 1/563 323/280 |

FOREIGN PATENT DOCUMENTS

EP    892332 A1    1/1999

OTHER PUBLICATIONS

PCT International Search Report and Written Opinion, PCT Application No. PCT/US2014/024994, Jul. 1, 2014, 15 pages.
Extended European Search Report from corresponding EP Application No. 14773369.5 dated Mar. 8, 2016.

* cited by examiner

*Primary Examiner* — Adolf Berhane
*Assistant Examiner* — Afework Demisse
(74) *Attorney, Agent, or Firm* — Lando & Anastasi, LLP

(57) ABSTRACT

A power supply efficiently suppresses transient voltages by storing the maximum charge expected in the transient and releasing it during the transient event at a rate in an equal but opposite amount to the transient, preventing the battery voltage from collapsing. The described power supply provides improved efficiency compared to conventional architectures for transient suppression, thus increasing the length of time between battery charges and creating a better user experience.

23 Claims, 3 Drawing Sheets

TRANSIENT SUPPRESSION WITH LOSSLESS STEADY STATE OPERATION

CROSS-REFERENCE TO RELATED APPLICATIONS

This application claims the benefit of U.S. Provisional Patent Application No. 61/780,192 filed on Mar. 13, 2013 entitled "Transient Suppression with Lossless Steady State Operation," to Vikas Vinayak and Serge Francois Drogi, the contents of which are incorporated by reference herein.

BACKGROUND

1. Field of Technology

Embodiments disclosed herein relate to power supplies, and more specifically to managing transient load currents in a power supply.

2. Description of the Related Arts

Modern mobile devices such as laptops, smartphones and tablets typically include a re-chargeable battery to power the electronics inside. The batteries are often kept as small as possible in order to make the mobile device smaller and lighter. As a consequence, these batteries have finite capacity and a finite ability to deliver current to the load.

A battery's ability to deliver current is quantified by the internal resistance of the battery. When the battery is not connected to any loading circuit, it will show a particular voltage across its terminals called the "open circuit voltage." When a loading circuit is connected to the battery, current flows from the battery through the loading circuit. This increase in current causes the voltage across the terminals of the battery to droop below its open circuit voltage. Batteries with a larger internal resistance will produce a larger voltage droop for a given load current.

These load currents may be particularly large in modern electronic devices that include multiple circuits operating from a single battery, such as for example, application processors, digital baseband processors, image processors, etc. During start up or under other transient conditions that produce large current drains from the battery, the battery's voltage may fall until the voltage is no longer sufficient to sustain the operation of the loading circuits, causing the entire device to reset.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

A power supply efficiently suppresses transient voltages by storing charge and releasing the charge during the transient event at a rate in a substantially equal but opposite amount to the transient, preventing the battery voltage from collapsing. In one embodiment, the stored charge comprises a maximum amount of charge expected in the transient, or a charge within a predefined range of this expected maximum. The described power supply provides improved efficiency compared to conventional architectures for transient suppression, thus increasing the length of time between battery charges and creating a better user experience.

Figure 1:
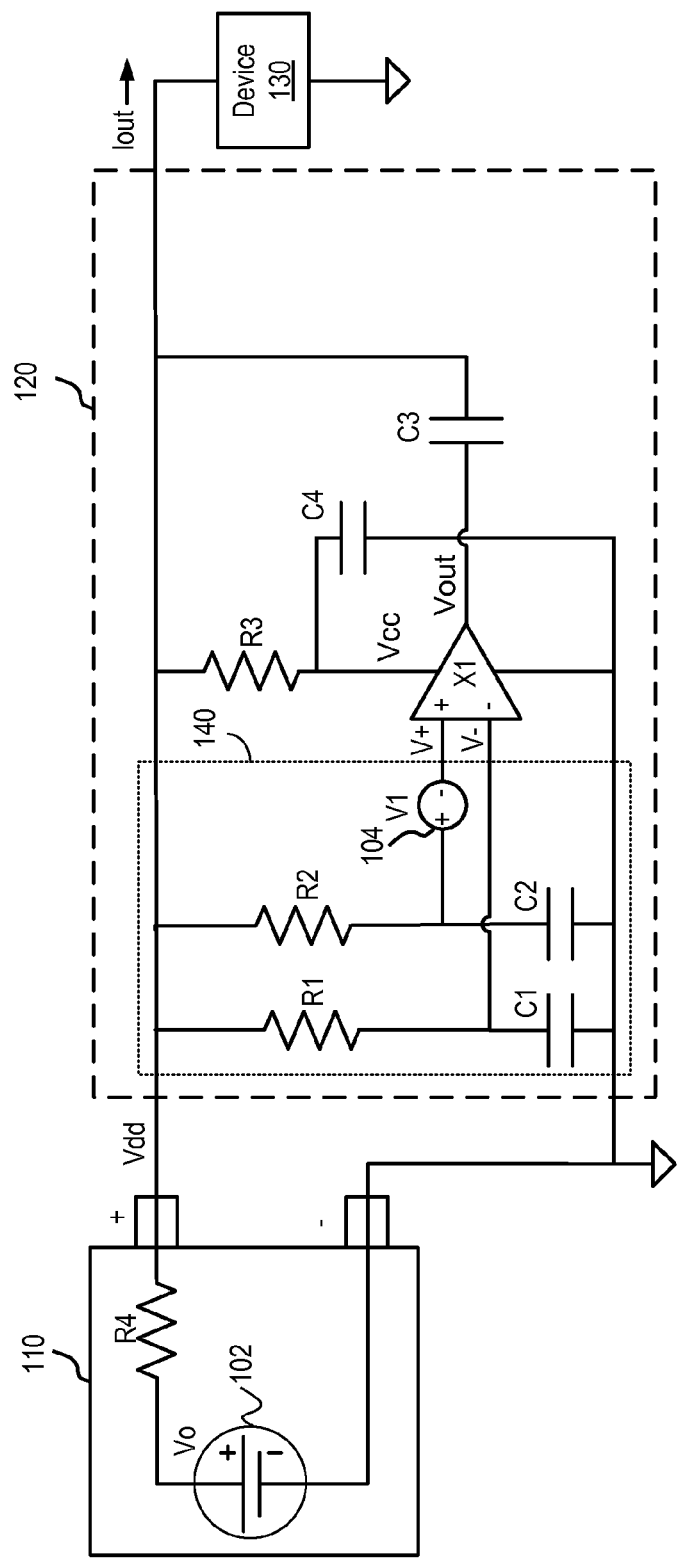
FIG. 1 is a circuit diagram illustrating a first embodiment of a load transient suppression circuit.

FIG. 1 illustrates a first embodiment of a load transient suppression circuit 120 coupled in parallel with a battery 110 and an electronic device 130. Battery 110 is represented in FIG. 1 as a voltage source 102 that produces a voltage Vo and an internal resistor R4, resulting in an overall battery voltage Vdd coupled to electronic device 130. Load transient suppression circuit 120 ensures that voltage Vdd does not drop below a threshold voltage (e.g., a minimum operating voltage of electronic device 130) during transient load conditions.

The load transient suppression circuit 120 comprises an operational amplifier X1, capacitors C3-C4, resistor R3, and an operational amplifier input circuit 140 including capacitors C1-C2, resistors R1-R2 and voltage subtraction circuit 104. Operational amplifier input circuit 140 produces differential voltage V+, V− provided to the operational amplifier X1 to supply a positive differential voltage under transient conditions and a negative differential voltage under nominal conditions. Voltage subtraction circuit 104 can be implemented using any conventional technique, such as, for example, a differential amplifier in a voltage subtraction configuration. During nominal load conditions, voltage V+ at the positive input node of operational amplifier X1 is below voltage V− of the negative input node due to the voltage drop V1. Thus, the output of operational amplifier X1 is railed to ground (e.g., Vout=0V) during nominal conditions. Thus, during nominal conditions, operational amplifier X1 does not deliver or consume any current other than its bias current. The supply terminal of operational amplifier X1 receives a supply voltage Vcc. The supply voltage Vcc approaches Vdd under nominal conditions and both C4 and C3 are charged to approximately Vdd. Assuming R4 is small, Vdd is approximately Vo.

Under transient conditions when device current Iout spikes up, voltage Vdd will start to drop due to the internal resistance R4 of battery 110. This causes voltage V− at the negative input node of operational amplifier X1 and V+ at the positive input node to drop at respective rates related to the respective time constants of $R_1C_1$ and $R_2C_2$. The values of resistor R1, R2 and capacitors C1, C2 are selected such that $\tau_1 = R_1C_1 \ll \tau_2 = R_2C_2$, where $\tau_1$ is the RC time constant of resistor R1 and capacitor C1 coupled to the negative input node of operational amplifier X1, and $\tau_2$ is the RC time constant of resistor R2 and capacitor C2 coupled to the positive input node of operational amplifier X1. Due to the difference in time constants, voltage V− at the negative input node of the operational amplifier X1 drops faster than voltage V+ at the positive input node of the operational amplifier X1, and V− drops below V+. This causes output voltage Vout of operational amplifier X1 to rise above 0V during transient load conditions. Vdd is then pushed back up as current starts flowing through capacitor C3 via Vout.

The current from operational amplifier X1 come from the power supply voltage Vcc of operational amplifier X1. To supply this current, C4 starts discharging. Resistor R3 ensures that the current flowing from C3 boosts Vdd and does not charge C4. C3 and C4 will continue to sustain the output voltage at Vdd until both capacitors are roughly Vo/2 (assuming C3=C4). The values of C3 and C4 are selected such that the voltages across them do not reach Vo/2 until the end of the transient period. Once the transient period ends, capacitors C3 and C4 slowly charge back to approximately Vo.

To achieve the desired functionality, R3 is generally larger than R4. If R3 is too small, charge pumped out by capacitor C3 may be dissipated in large portion by resistor R3. However, if R3 is large compared to R4, then most of the charge from capacitor C3 will flow to device 130. However, a larger value of R3 will increase the time it takes to recharge capacitor C4 after the transient event. Thus, the exact value of R3 may be determined based on the desired tradeoffs.

Figure 2:
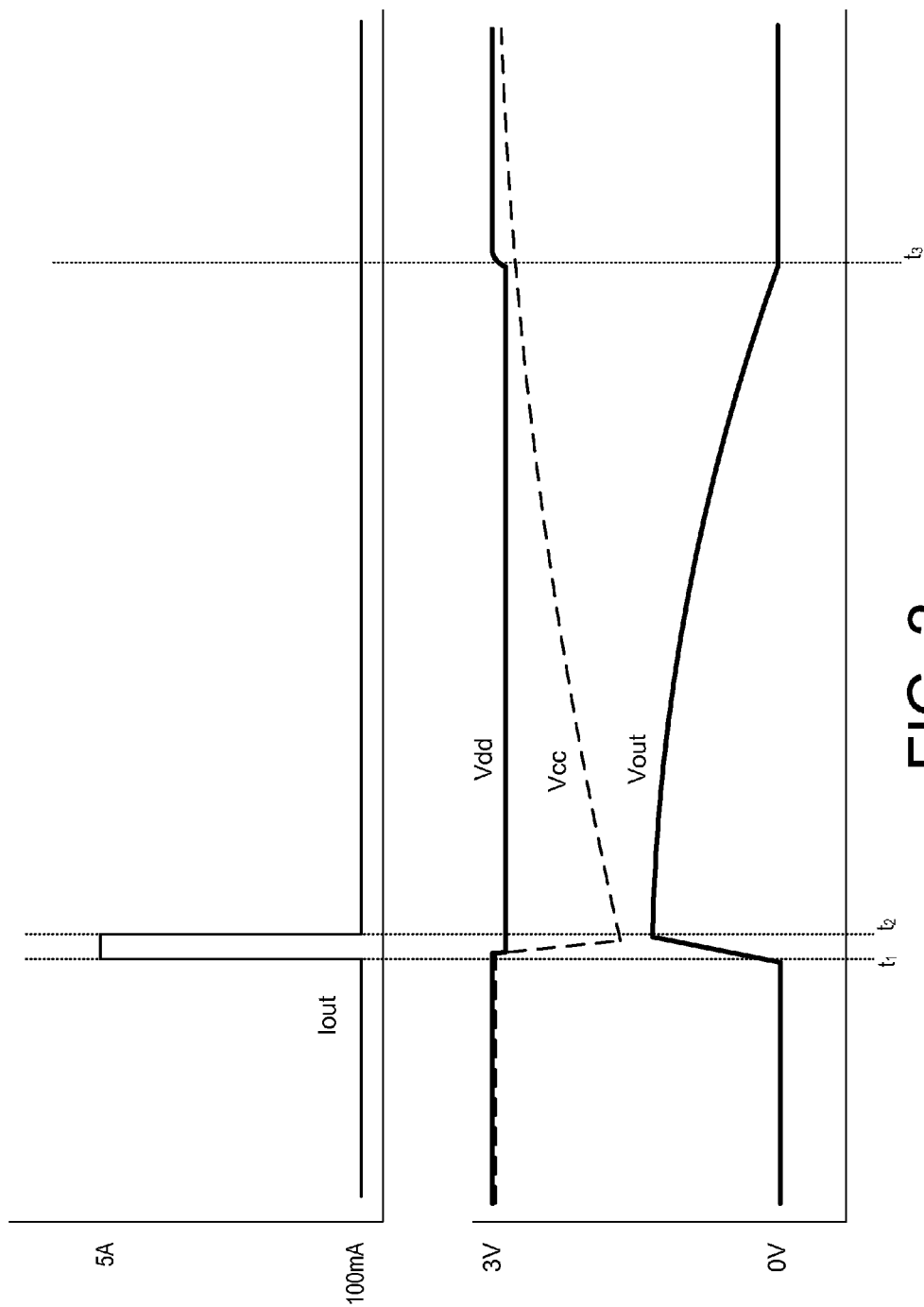
FIG. 2 is a waveform diagram illustrating example waveforms associated with operation of a load transient suppression circuit.

FIG. 2 illustrates example waveforms representing operation of load transient suppression circuit 120 of FIG. 1. In this example, battery 110 produces a voltage of Vo=3V and has a internal resistance of R4=0.5 ohms under transient conditions. Under nominal conditions, electronic device 130 draws a current Iout of 100 mA, resulting in Vdd=2.95V. At a time $t_1$, load current Iout spikes up to 5 A which causes Vdd to begin to drop. The drop in Vdd causes voltage V+ to rise above voltage V−, which in turn causes Vout to begin to rise. The rise in Vout stabilizes Vdd and prevents Vdd from dropping further. Particularly, the rising Vout increases current through capacitor C3 during the transient condition (between time $t_1$ and time $t_2$ in FIG. 2). C3 furthermore discharges to provide current to device 130 and prevent Vdd from collapsing. Vcc also drops between $t_1$ and $t_2$ as C4 discharges. At time $t_2$, the transient period ends and output current Iout drops back down to 100 mA. When this occurs, C3 and C4 begin to charge back up, thus causing Vout to drop and Vcc to increase back up to approximately 3V. Vdd rises back up to approximately 3V once Vout reaches approximately 0V and capacitor C3 is fully charged at time $t_3$.

The total capacitance of C3 and C4 are selected such that such that the transient voltage Vdd is always above a minimum operating voltage of electronic device 130 for a given battery voltage. For instance, in the example above a total capacitance of 700 μF (e.g., C3=C4=350 μF) will ensure that Vdd remains above 2.7V for a 3V battery.

Figure 3:
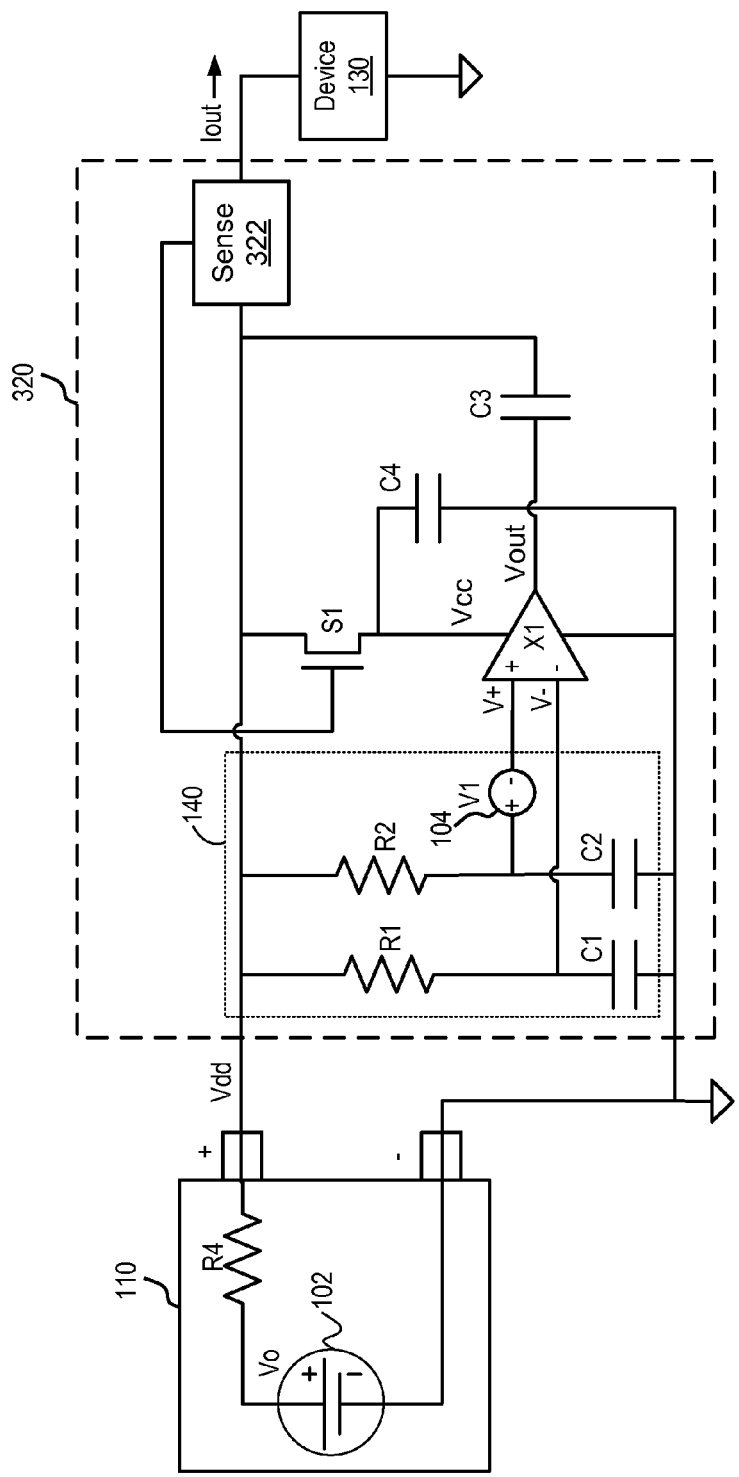
FIG. 3 is a circuit diagram illustrating a second embodiment of a load transient suppression circuit.

FIG. 3 illustrates an alternative embodiment of a load transient suppression circuit 320. In this embodiment, resistor R3 is replaced with a switch S1 (e.g., a transistor) that is controlled based on the detection of a transient event, but otherwise the embodiment of FIG. 3 is similar to that of FIG. 2. In one embodiment, a sense circuit 322 senses a transient event by monitoring voltage Vdd or current Iout. For example, sense circuit 322 detects a transient condition when Vdd drops below a threshold voltage or when a magnitude of a rate of change of Vdd exceeds below a threshold rate. Alternatively, sense circuit 322 may detect the transient condition when Iout rises about a threshold current or when a magnitude of a rate of change of Iout rises above a threshold rate. In response to detecting the transient condition, sense circuit 322 turns switch S1 off, thus causing the Vcc node of operational amplifier X1 to draw current from capacitor C4. When sense circuit senses 322 that the transient condition ends, switch S1 is turned back on. Switch S1 remains on during nominal conditions, thus allowing capacitor C4 to charge back up to approximately Vdd.

Upon reading this disclosure, those of skill in the art will appreciate still additional alternative designs for a load transient suppression circuit. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

The invention claimed is:

1. A load transient suppression circuit to couple to a battery voltage terminal providing power to an electronic device, the load transient suppression circuit comprising:
    an operational amplifier to receive a bias current via a bias input during a transient load condition and to provide an output current during the transient load condition;
    a bias capacitor, coupled to the bias input of the operational amplifier, to discharge during the transient load condition to supply the bias current;
    an output capacitor, coupled between an output of the operational amplifier and the battery voltage terminal, to provide a discharge current to the electronic device during the transient load condition to prevent the battery voltage terminal from dropping below a threshold voltage; and
    an operational amplifier input circuit to provide a first voltage to a positive input terminal of the operational amplifier and to provide a second voltage to a negative input terminal of the operational amplifier, the second voltage being greater than the first voltage during a nominal load condition and the second voltage dropping below the first voltage in response to the transient load condition to cause the operational amplifier to provide the output current during the transient load condition.

2. The load transient suppression circuit of claim 1 wherein the operational amplifier input circuit comprises:
    a first RC circuit having a first time constant, the first RC circuit coupled to the battery voltage terminal, and the first RC circuit to provide the first voltage to the positive terminal of the operational amplifier; and
    a second RC circuit having a second time constant, the second RC circuit coupled to the battery voltage terminal, and the second RC circuit to provide the second voltage to the negative terminal of the operational amplifier.

3. The load transient suppression circuit of claim 2 wherein the first RC circuit comprises a voltage subtraction circuit to cause the first voltage to the positive terminal of the operational amplifier to be lower than the second voltage to the negative terminal of the operational amplifier during the nominal load condition.

4. The load transient suppression circuit of claim 2 wherein the second time constant is larger than the first time constant so that the second voltage to the negative terminal of the operational amplifier drops below the first voltage to the positive terminal of the operational amplifier during the transient load condition.

5. The load transient suppression circuit of claim 1 further comprising a switch to couple the battery voltage terminal to the bias input of the operational amplifier during the nominal load condition and to decouple the battery voltage terminal from the bias input during the transient load condition.

6. The load transient suppression circuit of claim 1 further comprising a resistor coupled between the battery voltage terminal and the bias input of the operational amplifier.

7. The load transient suppression circuit of claim 1 wherein the bias capacitor and output capacitor are configured to collectively store an amount of charge during the nominal load condition based on an expected maximum drop in battery voltage during the transient load condition and an expected maximum duration of the transient load condition.

8. A load transient suppression circuit to couple to a battery voltage terminal providing power to an electronic device, the load transient suppression circuit comprising:
  an operational amplifier to receive a differential input voltage and produce an output current responsive to the differential input voltage being positive;
  an operational amplifier input circuit to provide the differential input voltage to the operational amplifier, the differential input voltage being positive during a transient load condition, and the differential input voltage being negative during a nominal load condition; and
  an output capacitor coupled between an output of the operational amplifier and the battery voltage terminal to supply a discharge current to the electronic device in response to the output current produced by the operational amplifier during the transient load condition, the discharge current sufficient to prevent the battery voltage terminal from dropping below a threshold voltage.

9. The load transient circuit of claim 8 further comprising a bias capacitor coupled to a bias input of the operational amplifier to supply a bias current to the bias input of the operational amplifier during the transient load condition to enable the operational amplifier to supply the output current.

10. The load transient suppression circuit of claim 9 wherein the output capacitor and bias capacitor are configured to collectively store an amount of charge during the nominal load condition based on an expected maximum drop in battery voltage of the transient load condition and an expected maximum duration of the transient load condition.

11. The load transient suppression circuit of claim 8 wherein the operational amplifier input circuit comprises:
  a first RC circuit having a first time constant, the first RC circuit coupled to the battery voltage terminal, and the first RC circuit to provide a first voltage to a positive terminal of the operational amplifier; and
  a second RC circuit having a second time constant, the second RC circuit coupled to the battery voltage terminal, and the second RC circuit to provide a second voltage to a negative terminal of the operational amplifier.

12. The load transient suppression circuit of claim 11 wherein the first RC circuit comprises a voltage subtraction circuit to cause the first voltage to the positive terminal of the operational amplifier to be lower than the second voltage to the negative terminal of the operational amplifier during the nominal load condition.

13. The load transient suppression circuit of claim 11 wherein the second time constant is larger than the first time constant so that the second voltage to the negative terminal of the operational amplifier drops below the first voltage to the positive terminal of the operational amplifier during the transient load condition.

14. The load transient suppression circuit of claim 8 further comprising a switch to couple the battery voltage terminal to the bias input of the operational amplifier during the nominal load condition and to decouple the battery voltage terminal from the bias input during the transient load condition.

15. The load transient suppression circuit of claim 8 further comprising a resistor coupled between the battery voltage terminal and the bias input of the operational amplifier.

16. A method for suppressing a load transient in a power supply circuit in which a battery voltage provides power to an electronic device, the method comprising:
  providing a differential input to an operational amplifier, the differential input indicative of a load condition of the electronic device, the differential input having a first polarity value responsive to a transient load condition being met;
  producing an output current at an output of the operational amplifier responsive to the differential input having the first polarity value;
  boosting the battery voltage via an output capacitor responsive to the output current; and
  supplying a discharge current from the output capacitor to the electronic device during the transient load condition in response to producing the output current, the discharge current sufficient to prevent the battery voltage terminal from dropping below a threshold voltage.

17. The method of claim 16 further comprising supplying a bias current to a bias input of the operational amplifier from a bias capacitor during the transient load condition to enable the operational amplifier to supply the output current.

18. The method of claim 17 further comprising collectively storing by the output capacitor and the bias capacitor an amount of charge during the nominal load condition based on an expected maximum drop in battery voltage during the transient load condition and an expected maximum duration of the transient load condition.

19. The method of claim 16 wherein providing a differential input includes:
  producing a first voltage based on the battery voltage by a first RC circuit having a first time constant; and
  producing a second voltage based on the battery voltage by a second RC circuit having a second time constant.

20. The method of claim 19 wherein producing the first voltage includes subtracting a fixed voltage from an output of the first RC circuit to cause the first voltage at a positive terminal of the operational amplifier to be lower than the second voltage at a negative terminal of the operational amplifier during the nominal load condition.

21. The method of claim 19 wherein the second time constant is larger than the first time constant so that the second voltage to the negative terminal of the operational amplifier drops below the first voltage to the positive terminal of the operational amplifier during the transient load condition.

22. The method of claim 16 further comprising controlling a switch to couple the battery voltage terminal to the bias input of the operational amplifier during the nominal load condition and to decouple the battery voltage terminal from the bias terminal during the transient load condition.

23. The method of claim 16 wherein the battery voltage terminal is coupled to the bias input of the operational amplifier via a resistor.

* * * * *